United States Patent [19]

Limet et al.

[11] Patent Number: 4,738,281

[45] Date of Patent: Apr. 19, 1988

[54] MIXING VALVE

[75] Inventors: Henri Limet; Michel Jolibois, both of Reims; Jacques Blavier, St Brice Courcelles, all of France

[73] Assignee: Compagnie Internationale Des Produits Sanitaires CIPS, Reims Cedex, France

[21] Appl. No.: 943,772

[22] Filed: Dec. 19, 1986

[30] Foreign Application Priority Data

Dec. 20, 1985 [FR] France .................. 85 18909

[51] Int. Cl.⁴ ........................... F16K 11/078
[52] U.S. Cl. .................. 137/625.17; 137/625.4
[58] Field of Search ........... 137/625.17, 625.4, 625.41; 251/286, 288, 368

[56] References Cited

U.S. PATENT DOCUMENTS

| | | | |
|---|---|---|---|
| 3,023,769 | 3/1962 | Williams | 137/625.4 |
| 3,680,592 | 8/1972 | Hayman | 137/625.4 |
| 3,794,074 | 2/1974 | Watts | 137/625.4 |
| 3,965,935 | 6/1976 | Morisseau | 137/625.4 |
| 4,088,153 | 5/1978 | Paasikivi | 137/625.17 |
| 4,325,403 | 4/1982 | Uhlmann | 137/625.17 X |
| 4,362,186 | 12/1982 | Parkison et al. | 137/625.17 |
| 4,420,142 | 12/1983 | Dworak et al. | 137/625.41 X |

FOREIGN PATENT DOCUMENTS 1282377 11/1968 Fed. Rep. of Germany .
2564933 11/1985 France .
2123530 2/1984 United Kingdom .

Primary Examiner—Alan Cohan
Assistant Examiner—John Rivell
Attorney, Agent, or Firm—Schwartz, Jeffery, Schwaab, Mack, Blumenthal & Evans

[57] ABSTRACT

A ceramic plate mixing valve is provided, including a fixed plate and a mobile plate, both made from ceramic, mounted inside a body also housing a ball lever coupled to the mobile plate by an offset projection and the shape of the mobile plate, which has no bore, is approximately that of a trapezium with rounded ends.

11 Claims, 4 Drawing Sheets

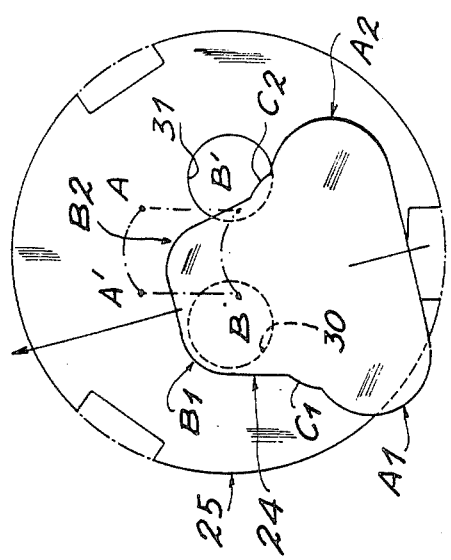
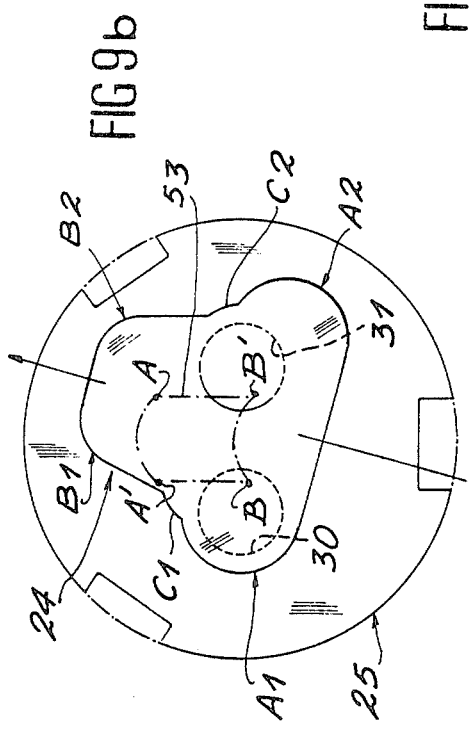
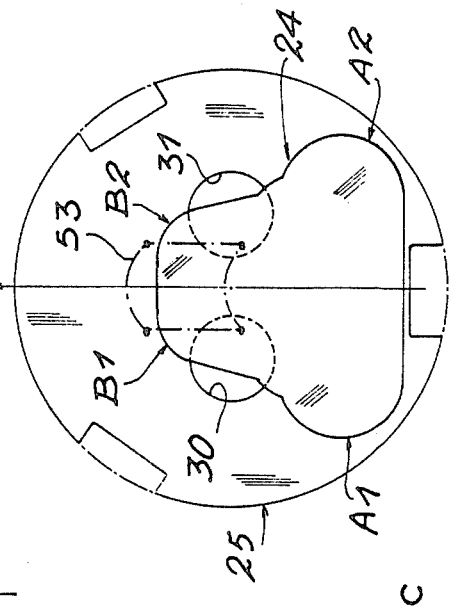
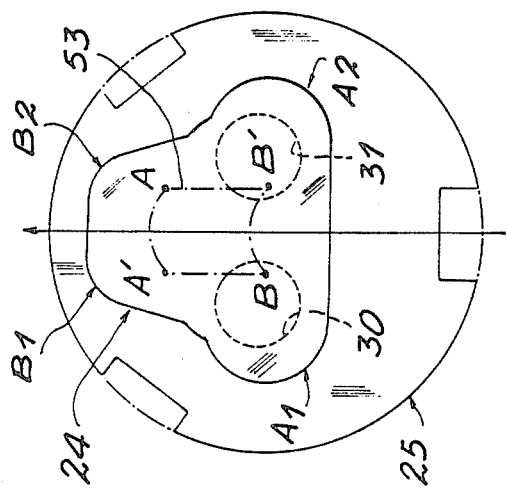

MIXING VALVE

BACKGROUND OF THE INVENTION

The invention relates to a mixing valve for mixing two flows and intended more particularly for the sanitary field, for mixing hot water and cold water. The invention relates more particularly to the field of valves of a particular type in which the elements providing the mixing are ceramic plates with polished contacting surfaces and movable with respect to each other.

So called mixing valves, with ceramic plates (sintered alumina oxide) also called "mirrors" because of their smooth surfaces in mutual contact, are more and more appreciated in the field of sanitary ware. The ceramic plates very often comprise duct elements communicating from one plate to another so that the flow section of the two fluids is made adjustable before mixing thereof properly speaking, by positioning the two plates. Known systems very generally have a fixed ceramic plate and a movable ceramic plate, whose position may be varied by means of a single control in the form of a lever, movable in two directions corresponding respectively, for the user, to adjustment of the mixed water flow rate and to the adjustment of the ratio of the two fluid flows in said mixture.

Up to now, all the systems proposed are such that the arc for adjusting the mixture described at full flow of mixed water is less than that which is described at low flow rates. Consequently, the operating forces required and the sensitivity of adjustment are not constant depending on the position of the flow rate lever. The modification of one of the adjustments is reflected to a greater or lesser degree on the other.

A first object of the invention is to provide a valve with polished plates, actuated by a single lever and the two adjustments of which are really independent.

Furthermore, known devices are provided with plates pierced so that, for the most part, the two flows of cold and hot water pass through the fixed plate, are mixed at the level of the movable plate without passing therethrough and so that this mixture is discharged towards an outlet substantially parallel to the two inlets, generally through an additional orifice in the fixed plate. This path of the water through the valve and particularly the complete change of direction which occurs between the fixed and movable plates is very generally the cause of relatively troublesome operating noises, so that numerous valves of this kind are provided with an antinoise strainer which moreover has the major drawback of becoming very rapidly clogged up. Another aim of the invention is to propose a device with a low operating noise level, without strainer, particularly because of the fact that the mixed water may be discharged laterally along the contour of the movable plate, which comprises no duct element, the characteristics of the two adjustments respectively of the flow rate and of the mixture being obtained by the very shape of said contour.

SUMMARY OF THE INVENTION

To this end, the invention relates especially to a mixing valve for mixing two fluid flows, including a body containing two plates each having a flat and smooth face, these flat faces being in contact with each other, one of the plates being fixed and having two orifices respectively in communication with inlet ducts of the two flows and the other plate being movable and coupled to a ball joint lever, a lateral outlet being arranged in the vicinity of the edge of the movable plate, wherein said ball joint lever is provided so as to move in a predetermined pivoting direction defined by a guide groove fixed with respect to said body, with the possibility of rotation about its axis, of a predetermined amplitude for any position along said pivoting direction, the two end positions of rotation being defined by at least one stop on said lever cooperating with the edges of said groove and said movable plate, coupled to said ball joint lever by an offset projection on this latter has the approximative form of a trapezium at the rounded ends.

Of course, in the present state of the art, the above defined plates are preferably ceramic plates or "mirrors" having respectively smooth contacting surfaces for ensuring the distribution and mixing of the two said flows. It is however evident that the invention in fact covers any device having plates whose shapes and mounting correspond to the above definition, even if these plates are not made from ceramic, but from a material whose surface condition and mechanical characteristics allow substantially equivalent, even inferior, results to be obtained in so far as sealing on closure is more particularly concerned.

According to another particular feature of the invention, said rounded ends are portions of circles, the radii and the positions of these circles being derived from the "kinematics" imposed on the movable plate by said ball joint lever, as will be clear further on.

BRIEF DESCRIPTION OF THE DRAWINGS

The invention will be better understood and other advantages thereof will be clearer from the following description of one embodiment at present preferred of a mixing valve formed according to its principle, given solely by way of example and with reference to the accompanying drawings in which:

FIGS. 9a to 9d illustrate schematically, by their contours, the fixed and movable plates in the relative positions which they occupy for four remarkable positions of the ball joint lever which controls the movable plate.

DESCRIPTION OF THE PREFERRED EMBODIMENT

Figure 1:
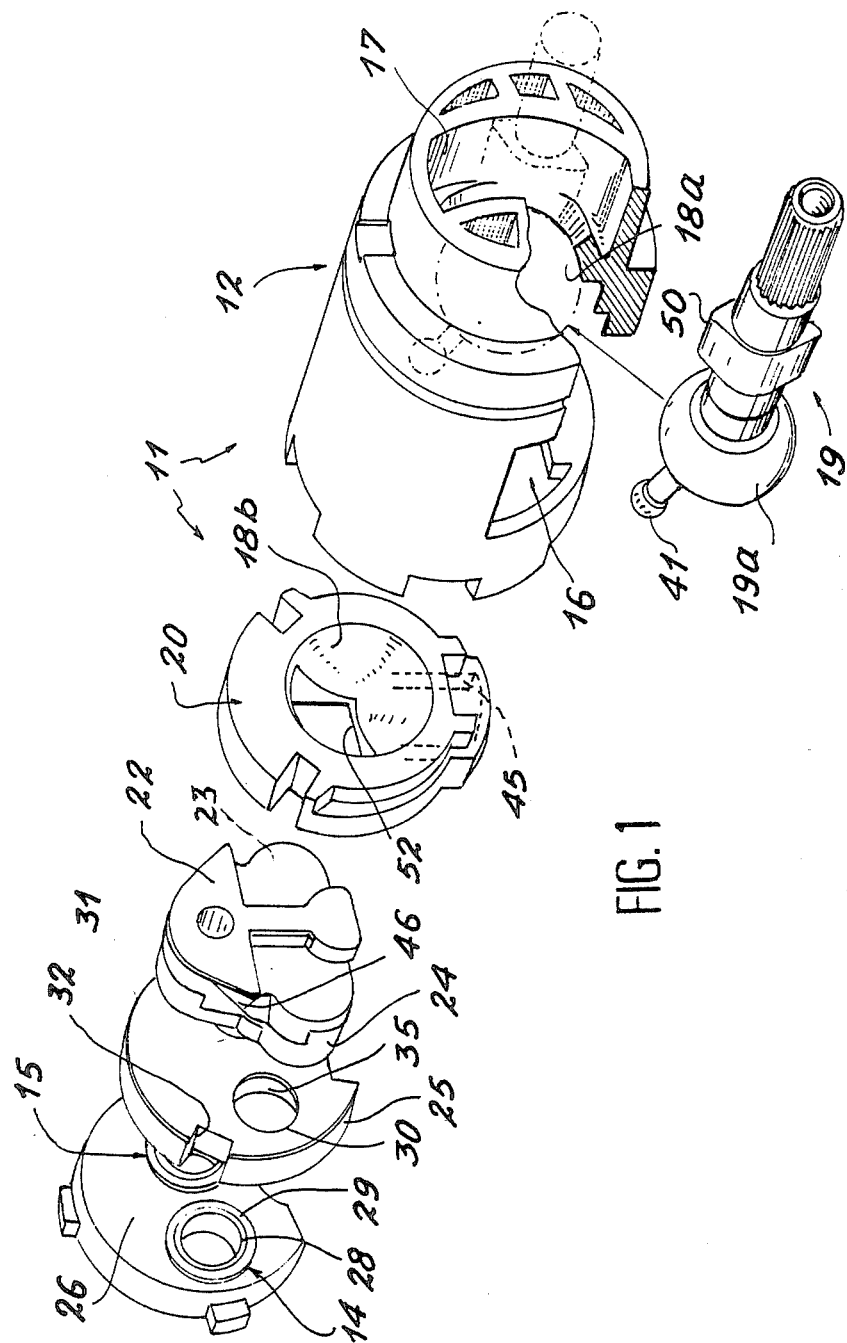
FIG. 1 is an exploded perspective view of the component elements of the valve.

Referring to the drawings, a mixing valve 11 is shown including a body 12, made for example from a molded plastic material, intended to be inserted in an adapted cavity of a tap 13 sketched in with broken lines in FIG.

Figure 2:
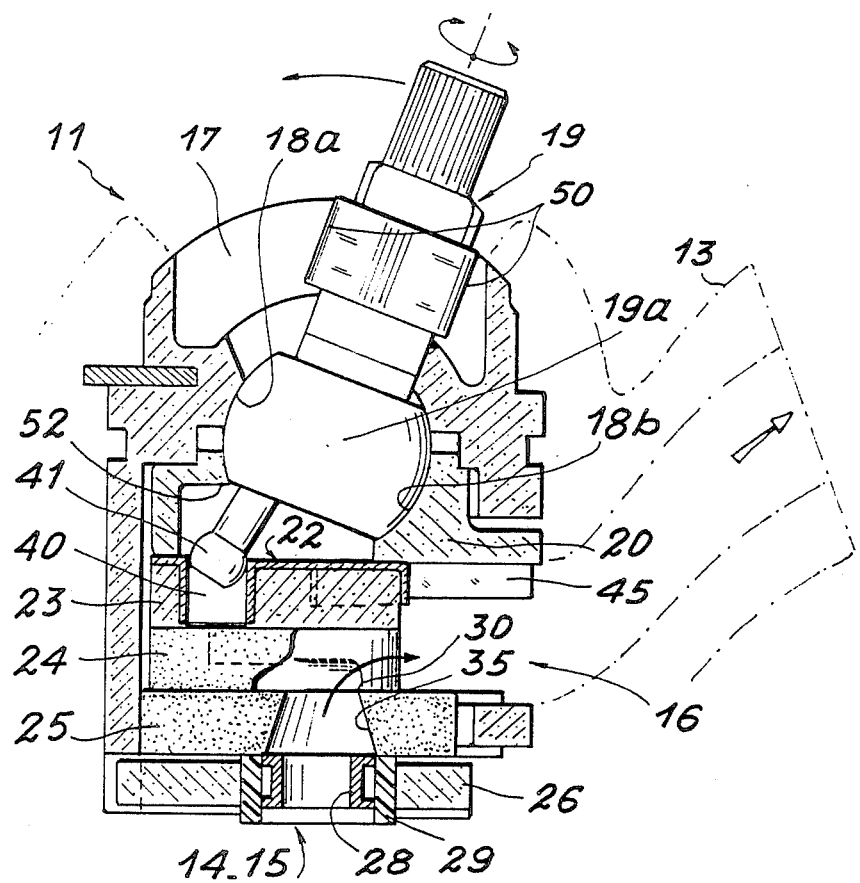
FIG. 2 is a sectional view with parts cut away of the assembled valve.

2. The two flows of hot water and cold water are introduced respectively into the body through two inlets 14 and 15 situated at the lower part of the body (considering FIG. 2), whereas a wide lateral outlet 16 for the mixed water opens opposite the outlet duct of tap 13. As is shown in FIGS. 1 and 2, the valve body 12 is shaped so as to have, at its upper part, a curved guide groove 17 opening into a cavity portion 18a with spherical surface provided for articulating the ball lever 19. Body 12 further houses, and in this order, said ball lever 19, engaged in the groove 17, an internal base 20 fixed to the inside of the body and shaped more particularly so as to define the other cavity portion 18b with spherical surface in which the ball 19a of lever 19 is articulated, a thin wall coupling piece 22 made from a self lubricating material, an operating plate 23, a movable ceramic plate 24, a fixed ceramic plate 25 and a bottom wall 26 fixed to said body and having in its thickness two bores for the cold water and hot water inlets. Each bore houses a metal connecting ring 28, surrounded by the tubular seal 29 made from rubber or an equivalent elastomer material. This arrangement thus defines the hot water inlet 14 and the cold water inlet 15 at the lower end of the valve body formed by the bottom wall 26. The "ceramic" of plates 24 and 25 is preferably alumina oxide; the form of the plates is obtained by sintering. The fixed plate 25 has the approximate shape of a disk with, along its circular edge, notches 32 cooperating with internal lateral projection on said body 12, for immobilizing said fixed plate in said body. The seals 29 are sealingly applied about the lower orifices of two slanting conical bores 35 extending in the thickness of the fixed plate 25 and whose upper circular orifices 30 and 31 (respectively for the hot water and the cold water) open in to the smooth face of the movable plate 24. The two orifices 30 and 31 are spaced apart by a chosen distance and have a predetermined diameter. As will be seen further on, this spacing distance and this diameter are important parameters in determining the shape and the dimensions of the movable plate.

Figure 3:
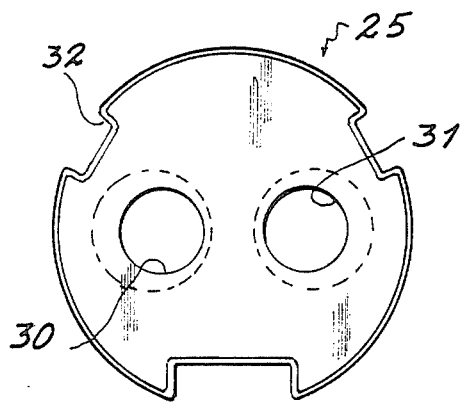
FIG. 3 shows the fixed plate and more particularly its face in contact with said movable plate.
Figure 4:
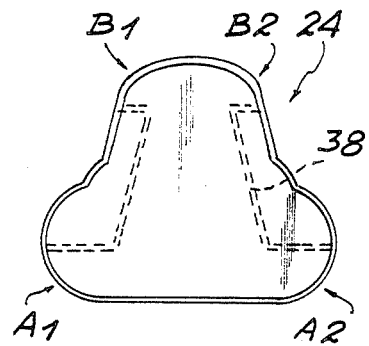
FIG. 4 shows the movable plate and more particularly its face in contact with said fixed plate.
Figure 7:
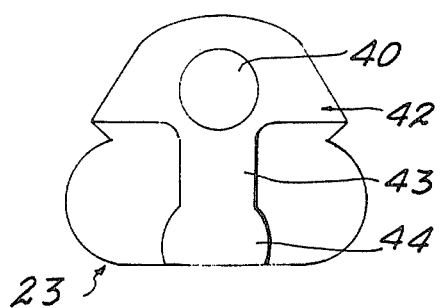
FIG. 7 shows the same operating plate seen from the side opposite that of FIG. 6.
Figure 8:
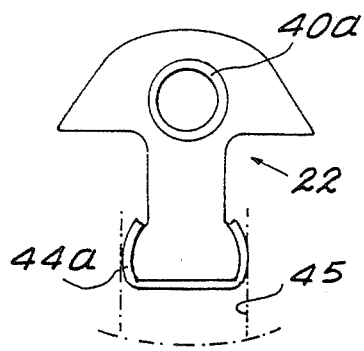
FIG. 8 shows the coupling piece of FIG. 6, seen from the side which fits into said operating plate.
Figure 5:
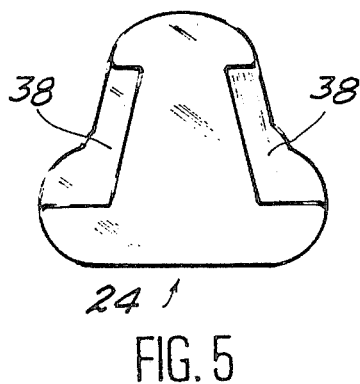
FIG. 5 shows the movable plate and more particularly the other face thereof.
Figure 6:
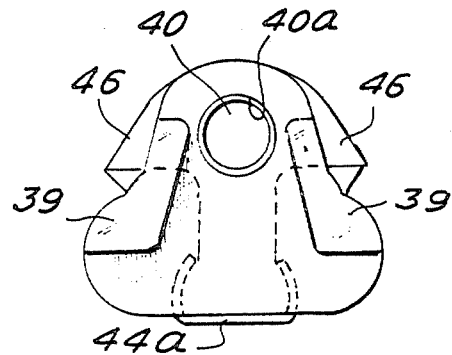
FIG. 6 shows a plate for operating the mobile plate and more particularly the face thereof which fits into said mobile plate, a self lubricating coupling piece being also shown in position on the other side of said operating plate.

The movable plate 24 is in contact with its smooth face shown in FIG. 4 with the fixed plate 25 shown in FIG. 3. It has no bore. The variable closure of orifices 30 and 31 is defined by the special contour of plate 24. The opposite face of this latter (FIG. 5) has a relief defined by two lateral recesses 38. A complementary relief formed by two insertable cheeks 39 is formed on the operating plate 23. This latter, made from a molded plastic material, thus fits naturally onto the movable plate 24. The operating plate has a cavity 40 in which is engaged a projection 41 projecting from the lower part of ball 19a. The projection 41 is offset with respect to lever 19. The face 42 of the operating plate 23 opposite the movable plate includes a guide rib 43 having a rounded enlarged portion 44 engaged in a fixed groove 45 defined at the lower face (still considering FIG. 2) of the internal base 20. The coupling piece 22 (made from a plastic material reinforced with molybdenum bisulfite) is formed so as to cover the edges and the internal wall of cavity 40, as well as rib 43 and its enlarged rounded portion 44, particularly the sides thereof. For this purpose it has a tubular portion 40a and a skirt 44a with bulging profile. In addition, the sides of the operating plate 23 have overhanging surfaces 46, extending the insertable cheeks 39. This structural feature forms a deflector for the water leaving orifices 30 and 31, which promotes the silent flow of the water to the lateral outlet 16, while avoiding cavitation phenomena. In an important feature of the invention, the ball lever 19 is controlled to move in a predetermined pivoting direction defined by groove 17, the pivoting center being that of ball 19a. The lever is further mounted with the possibility of rotating about its axis, by a predetermined amplitude, for each of its positions along said groove. For this, lever 19 has a double stop 50, in the form of a cam, engaged in the thickness of groove 17 and able to come into contact with the sides thereof. The two end rotational positions of the lever on itself are thus defined when the double stop 50 comes into contact with the sides of groove 17. The offcentered projection 41 is situated substantially in a plane of symmetry of stop 50. It passes through a lower window 52 in the internal base 20 so as to transmit its movement to the mobile plate 24 via the operating plate 23. Thus, the end of projection 42 may occupy any position in an area defined by a contour 53 shown with dot dash lines in FIGS. 9a to 9d, the contour 53 itself corresponding to at least one end position (rotational or pivotal following the above definitions) of the ball lever 19.

Of course, the pivoting movement (along groove 17) controls the water flow rate at outlet 16, whereas the rotational movement of the lever about its axis controls the mixing of the hot water and of the cold water.

It will be readily understood that, because of the design and mounting of the ball lever, in accordance with the above description, the two adjusting movements are totally independent since, for any pivoting position of the lever, the amplitude of rotation of this same lever is constant and determined by stop 50 in groove 17.

According to an important feature of the invention, the face of the movable plate 24 in contact with the fixed plate 25 has the approximate shape of a "trapezium" with rounded ends (see FIG. 4). Said rounded ends are more particularly portions of circles, since the orifices 30 and 31 which they must cover in some positions are also circular. Of course, if the orifices 30 and 31 were to have a different form, for example ovalized, the rounded ends of the trapezium would not necessarily be circles, and the invention covers all these possible variants.

Considering more particularly FIGS. 9a to 9d, it is clear that the contour of the whole of the lower part of the "trapezium" is tied to the spacing and diameter of orifices 30 and 31. More precisely, the center of the circle portion defining each end $A_1$ or $A_2$ of the widest base of the "trapezium" is positioned so as to be substantially superimposed on the center of one (30, FIG. 9) of the two orifices of the fixed plate when the ball lever is placed at the end of groove 17 which corresponds to closure of the valve and in an end position of rotation on itself, respectively. In FIG. 9b, this particular position of the ball lever is such that the offcentered projection 41 is situated at A on contour 53. It can thus be seen that, with reference to FIG. 9b, the rounded end $A_1$ of the large base of the trapezium covers more particularly the orifice 30. When the ball lever is in the other possible position defined above, the other rounded end $A_2$ of the large base of the trapezium covers more particularly the orifice 31 and the offset projection 41 is then situated at A' on the contour 53. FIGS. 9a and 9b illustrate two closure configurations of the valve. In FIG. 9a, the valve is closed in a position of equal mixing of the two flows, whereas in FIG. 9d, the valve is closed in a position of maximum selection of one of the two flows (here the hot water).

Furthermore, each edge of said movable plate 24 between the two bases of said "trapezium" includes a circle portion $C_1$ or $C_2$ disposed so that, for each of the two end pivoting positions of said ball lever placed at the end of said guide groove which corresponds to closure of the valve (FIG. 9b), the center of the other (31) of the two orifices merges substantially with the center of one of these circle portions (C), respectively. It can be seen that in this closure position of the valve in which the offset projection is at A, the circle portion $C_2$ improves the closure sealing of orifice 31. In the other symmetrical closure position in which the offset projection is at A', the circle portion $C_1$ improves the sealing of closure of orifice 30.

Similarly to what has been described above, the center of the circle portion defining each end $B_1$ or $B_2$ of the shortest base of said trapezium is positioned so as to be substantially superimposed on the center of one (30, FIG. 9d) of the two orifices of the fixed plate when said ball lever is placed at the end of the guide groove 17 which corresponds to maximum opening of the valve and in an end position of rotation on itself, respectively. In FIG. 9d, this particular position of the ball lever is such that projection 41 is at B on the contour 53. It can be seen that under these conditions the rounded end $B_1$ of the small base of the trapezium covers more particularly the orifice 30. When the ball lever is in the other possible mixing position for maximum opening, the other rounded end $B_2$ of the small base of the trapezium covers more particularly the orifice 31 and the offset projection is at B' on the contour 53. FIGS. 9c and 9d illustrate two maximum opening configurations of the valve. In FIG. 9c, the valve is open to the maximum in a position of equal mixing of the two flows, whereas in FIG. 9d the valve is completely open in the position of maximum selection of one of the flows (here the cold water).

It is clear that the foregoing description of the contour of the movable plate forms in fact a veritable methodology for determing said contour as a function of the movement imparted by the lever to the ball on the one hand and of the bores formed in the fixed plate on the other. The invention covers then all the technical equivalents resulting in a different shape obtained by applying the same principles.

What is claimed is:

1. A mixing valve for mixing two flows including a body housing two plates each having a flat and smooth face, these flat faces being in contact with each other, one of the plates being fixed and having two orifices respectively in communication with inlet ducts for the two flows and the other plate being movable and coupled to a ball lever, a lateral output being arranged in said body in the vicinity of the edge of the movable plate, wherein said ball lever is controlled so as to move in a predetermined pivoting direction defined by a guide groove fixed with respect to said body, with the possibility of rotation about its axis with a predetermined amplitude, for any position along said pivoting direction, the two end positions of rotation being defined by at least one stop on said lever cooperating with the edges of said groove and said movable plate coupled to said ball lever by an offset projection thereof, has the approximate shape of a trapezium with rounded ends, said trapezium having an external contour cooperating with said orifices for controlling said flows, said movable plate being free of orifices and cavities on its flat face.

2. The mixing valve as claimed in claim 1, wherein said rounded ends are circle portions.

3. The valve as claimed in claim 1 wherein the face of said movable plate opposite the one which is in contact with said fixed plate has a relief fitting into complementary relief of an operating plate including a cavity in which said offset projection is engaged.

4. The valve as claimed in claim 3, wherein said operating plate includes a guide groove with an enlarged rounded portion engaged in a fixed groove.

5. The valve as claimed in claim 1, wherein said fixed and movable plates are, in a way known per se, made from a selected ceramic, for example from alumina oxide.

6. The valve as claimed in claim 8, wherein the shape of each plate is obtained by sintering.

7. A mixing valve as recited in claim 1, wherein said rounded end of the wide base of said trapezium is defined so as to be substantially superimposed with one of the two orifices of said fixed plate when said ball lever is placed at the end of the guide groove which corresponds to closure of the valve and in an end position of rotation on itself, respectively.

8. A mixing valve as recited in claim 1, wherein each rounded end of the short base of said trapezium is positioned so as to be substantially superimposed with the center of one of the two orifices of said fixed plate, when said ball lever is placed at the end of the guide groove which corresponds to maximum opening of the valve and in an end position of rotation, respectively.

9. A mixing valve for mixing two flows, including a body housing two plates each having a flat and smooth face, these flat faces being in contact with each other, one of the plates being fixed and having two orifices respectively in communication with inlet ducts for the two flows and the other plate being movable and coupled to a ball lever, a lateral outlet being arranged in the vicinity of the edge of the movable plate, said ball lever is controlled so as to move in a predetermined pivoting direction defined by a guide groove fixed with respect to said body, with the possibility of rotation about its axis with a predetermined amplitude, for any position along said pivoting direction, the two end positions of rotation being defined by at least one stop on said lever cooperating with the edges of said groove and said movable plate coupled to said ball lever by an offset projection thereof, has the approximative shape of a trapezium with rounded ends, wherein said rounded ends are circle portions and wherein the center of the circle portion defining each end of the widest bases of said trapezium is positioned so as to be substantially superimposed with the center of one of the two orifices of said fixed plate when said ball lever is placed at the end of the guide groove which corresponds to closure of the valve and in an end position of rotation on itself, respectively.

10. The valve as claimed in claim 9, wherein each edge of said movable plate, included between the two bases of said trapezium, includes a circle portion disposed so that, for each of the end positions of pivoting of said ball lever at the end of said guide groove which corresponds to closure of the valve, the center of the other of the two orifices merges substantially with the center of one of these circle portions respectively.

11. The valve as claimed in claim 9, wherein the center of the circle portion defining each end of the shortest base of said trapezium is positioned so as to be substantially superimposed with the center of one of the two orifices of said fixed plate, when said ball lever is placed at the end of the guide groove which corresponds to maximum opening of the valve and in an end position of rotation, respectively.

* * * * *